G. WESTINGHOUSE, Jr.
Coupling-Valve.

No. 214,336. Patented April 15, 1879.

Witnesses
C. L. Parker
R. H. Whittlesey

Inventor George Westinghouse Jr.
By Attorney George H. Christy

UNITED STATES PATENT OFFICE.

GEORGE WESTINGHOUSE, JR., OF PITTSBURG, PENNSYLVANIA.

IMPROVEMENT IN COUPLING-VALVES.

Specification forming part of Letters Patent No. 214,336, dated April 15, 1879; application filed February 28, 1879.

*To all whom it may concern:*

Be it known that I, GEORGE WESTINGHOUSE, Jr., of Pittsburg, county of Allegheny, State of Pennsylvania, have invented or discovered a new and useful Improvement in Coupling-Valves; and I do hereby declare the following to be a full, clear, concise, and exact description thereof, reference being had to the accompanying drawings, making a part of this specification, in which—like letters indicating like parts—

Figure 1:
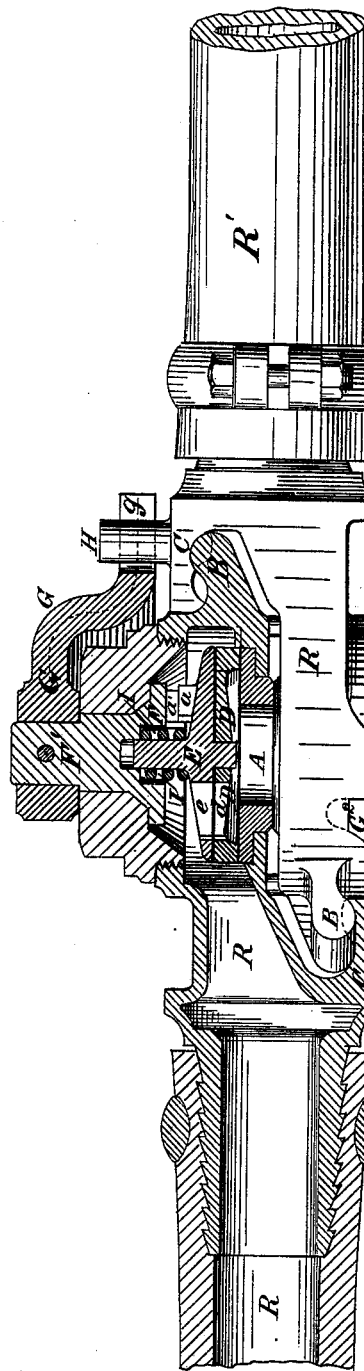
Figure 2:
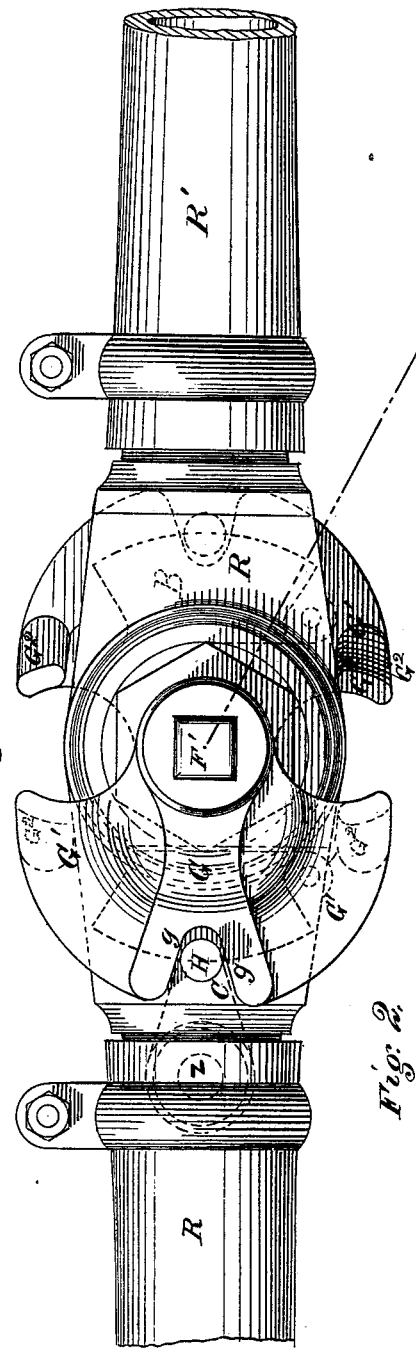

Figure 1 is a view of a pair of my improved couplings and valves, showing one half in section and the other half in edge view; and Fig. 2 is a top or plan view of the same.

In a separate application I have described a brake-pipe coupling having a valve opened and closed by a rotary motion.

The present improvement in its general features is believed to constitute a part of or come within the limits of the invention therein claimed; but it has also some features of construction which, not appearing in such other application, I desire to claim herein.

In the present improvement the rotary valve is combined with the lap-joint clutch-coupling described in reissued Letters Patent No. 8,291, granted to me June 18, 1878; but with such changes as will come within the knowledge of the skilled mechanic, this improvement may be incorporated into the structure of any "butt" or "lap joint" coupling wherein the packed coupling faces or ends abut against and rotate on each other for the purpose of making or completing or breaking the lock or clutch connection.

Two of the half-couplings referred to are represented at R R; and at R' R', I have shown the ends of the hose by means of which the connection is made therefrom to the fixed brake-pipes under the cars. Except as herein described, the coupling-shells, lateral port-openings, through passage-ways, and interlocking or clutch connections are substantially as described in said Reissue No. 8,291.

In each half-coupling, as shown in the drawings, each lateral port-opening is surrounded by a packing-ring, A, of india-rubber or other suitable material, and these packing-rings, projecting slightly beyond the face of the surrounding part of the shell, are pressed together when the half-couplings are united by the curved hooks B on one half fitting into a groove, C, on the other half, as shown, the two halves being first brought together in an angular position, as indicated by the dotted lines $x$, Fig. 2, and then turned upon each other round the axial line of the lateral ports until they are in a straight line, as shown.

On the back of each packing-ring A is a plate, D, made somewhat like a circular grating, or with any desired arrangement of ports $d$ therein, and serving as a seat to the rotary disk-valve E; also having any desired arrangement of ports $e$ therein, one or more, but such that when turned to one position one or more of its ports will communicate with those of D, but when turned to the reverse position it will cut off or close the ports of D. On the back of this valve is a stud, $a$, which enters the open part of a U-shaped stud, $a'$, depending from the disk F; or other suitable connection may be effected between the two, such that the rotation of F will rotate E. The disk F has a stem, F', passing air-tight through the cap of the coupling-shell, outside of which latter an arm, G, forked at its outer end, is affixed to the stem. The fork $g$ of this arm engages with a post, H, on the other half-coupling, so that when the two halves (having been previously coupled) are turned upon each other into the before-mentioned angular position or relation for uncoupling, the post H turns the arm G, and with it the valve E, so that the latter closes the port-openings through D before the half-couplings separate. In like manner, when the two half-couplings are again brought into the angular position for coupling, the forked arm G is again made to engage with the post H, so that on turning the two halves into the straight position the valve E is again turned back into the open position, or so as to uncover the port or ports in D. If while in this position the half-couplings are pulled forcibly apart by the accidental separation of the cars or otherwise, the valves remain open, and by the escape of fluid-pressure from the pipes through the open parts of the valves the brakes are brought into action. This occurs in what is commonly known as the "Westinghouse Automatic Brake," and this coupling is especially designed and adapted for use with brake apparatus of that class, or having substantially the same system of operation.

The arms G are provided with wings $G^1$, so formed as to prevent the two half-couplings from being coupled together in any other position than that in which each post H engages with the corresponding fork $g$, and they are also provided with stops $G^2$, for preventing the half-couplings being turned beyond a certain angular position. Any suitable spring, I, may be employed to hold the valve E to its seat on the ported plate D.

The posts H may be dispensed with by spreading apart and turning down the prongs of the fork $g$, so that they shall engage the opposite sides of the opposite half-coupling; or other suitable means may be employed to effect or secure such a connection between each arm G and the opposite half-coupling that in the act of coupling and uncoupling the movable parts of the valves shall thereby receive the same motion as the half-couplings themselves. Nor is the form of the valve material, provided only that its movable part shall have a rotary motion in opening and closing the ports through which fluid-pressure is transmitted from one brake-pipe to the next; and such rotary valve, instead of being arranged immediately over or under the lateral port-openings of the coupling-shells, may consist of an ordinary two-way cock, and be arranged in the nozzles of the half-couplings, as indicated at $z$, Fig. 2. In such case the handle of the plug would constitute the movable arm, and the forked arm G, Fig. 2, of the other half-coupling, being then rigid, would be the mechanical equivalent of the post H in the construction first described, and constitute a means for shifting the handle of the plug and opening and closing its ports while coupling and uncoupling.

I claim herein as my invention—

1. In pipe-couplings the abutting faces of which are rotated on each other in making and breaking a lock or union, a rotary ported valve in each half-coupling, with a connection from each such valve to some fixed part of the opposite half-coupling, substantially as set forth, whereby such valves shall receive the same rotary motions in either direction as that given to the half-couplings.

2. In combination with a half-coupling, R, a rotary valve, D E, stem F', arm G, and suitable devices for effecting a connection between the arm and the opposite half-coupling, substantially as set forth.

3. The combination, substantially as described, of rotary couplings, rotary valves, and fastenings automatically detachable under unusual strain, as well as by a partial reverse or back rotation, whereby in case of ordinary uncoupling by hand the valve-ports will be closed, but in case of forcible separation of the couplings they will be left open, for the purposes set forth.

4. The wings $G^1$, in combination with forked arms G, substantially as described.

In testimony whereof I have hereunto set my hand.

GEORGE WESTINGHOUSE, Jr.

Witnesses:
    CHAS. BERKLEY HARRIS,
        17 *Gracechurch Street, London, E. C.*
    JNO. DEAN,
        17 *Gracechurch Street, London, E. C.*